United States Patent Office 3,504,268
Patented Mar. 31, 1970

3,504,268
HIGH VOLTAGE CONVERTER HAVING COOLING CONDUITS WHICH GRADE VOLTAGE STRESS
Manfred Hoffmann, Stettiner Str. 34; Paul Fries, Rudelweiher Str. 41; and Karl F. Leowald, Masurenweg 3, all of Erlangen, Germany, and Friedrich Scherbaum, Unertl Str. 31, Munich, Germany
Filed Sept. 11, 1967, Ser. No. 666,895
Claims priority, application Germany, Sept. 15, 1966, S 105,884
Int. Cl. H02m 1/18
U.S. Cl. 321—11                     5 Claims

ABSTRACT OF THE DISCLOSURE

A high voltage electrical converter having a plurality of parallel spaced tiers disposed on a common axis. Each tier has a plurality of stacks of serially connected, fluid cooled, semiconductor devices, arranged in a substantially polygonal configuration. The conduit means for distributing and collecting the cooling medium for the stacks of semiconductor devices are arranged at the periphery of its associated tier, and are electrically connected to its associated stack, to effectively provide segmental electrical stress grading rings about each tier. The main headers for the cooling fluid, which supply and collect the fluid for the individual conduit means associated with each stack, are metallic tubular members which are disposed at the axial ends of the converter, to provide electrical stress grading rings through capacitive relationships.

Background of the invention

The invention relates in general to high voltage electrical converters, such as those used in high voltage DC electrical transmission systems, and more particularly to fluid cooled high voltage converters of the semiconductor type.

Summary of the invention

The invention is a new and improved fluid cooled, high voltage converter of the semiconductor type which utilizes metallic conduit means for distributing the cooling medium to the semiconductors, as electrical stress grading rings. The semiconductor devices are arranged in serially connected stacks, with each tier having a plurality of serially connected stacks arranged to provide a substantially polygonal configuration. The metallic conduits associated with each stack for distributing and collecting the cooling medium are electrically connected to its associated stack, to provide segmental stress grading rings about each tier. Vertical conduits disposed at the "corners" of the polygonal configuration are in fluid communication with horizontally disposed metallic tubular headers at the ends of the converter, with the headers providing electrical stress grading through their capacitive relationships with the converter.

Brief description of the drawing

Further advantages of the invention will become more apparent when considered in view of the following detailed description and drawings in which.

Description of the preferred embodiment

In certain applications, such as in DC transmission systems, high voltage DC is employed to transmit large amounts of power between AC networks. High voltage converters are necessary to convert the forms of electrical energy, with the DC transmission line being connected to the AC networks through electrical transformers and the high voltage converters.

Figure 1:
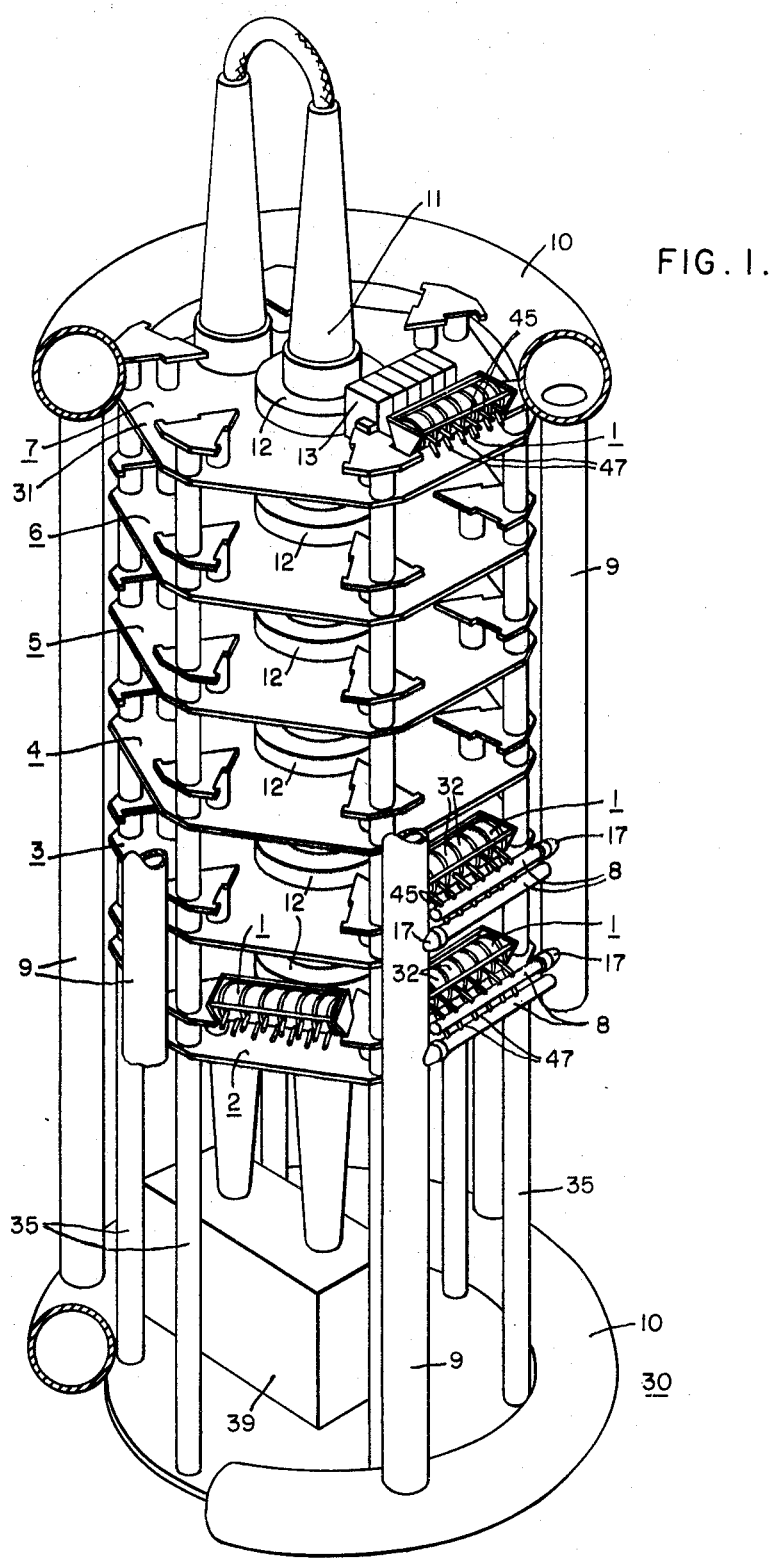
FIGURE 1 is a perspective view, partially in section, of a high voltage electrical converter constructed according to the teachings of the invention.
Figure 2:
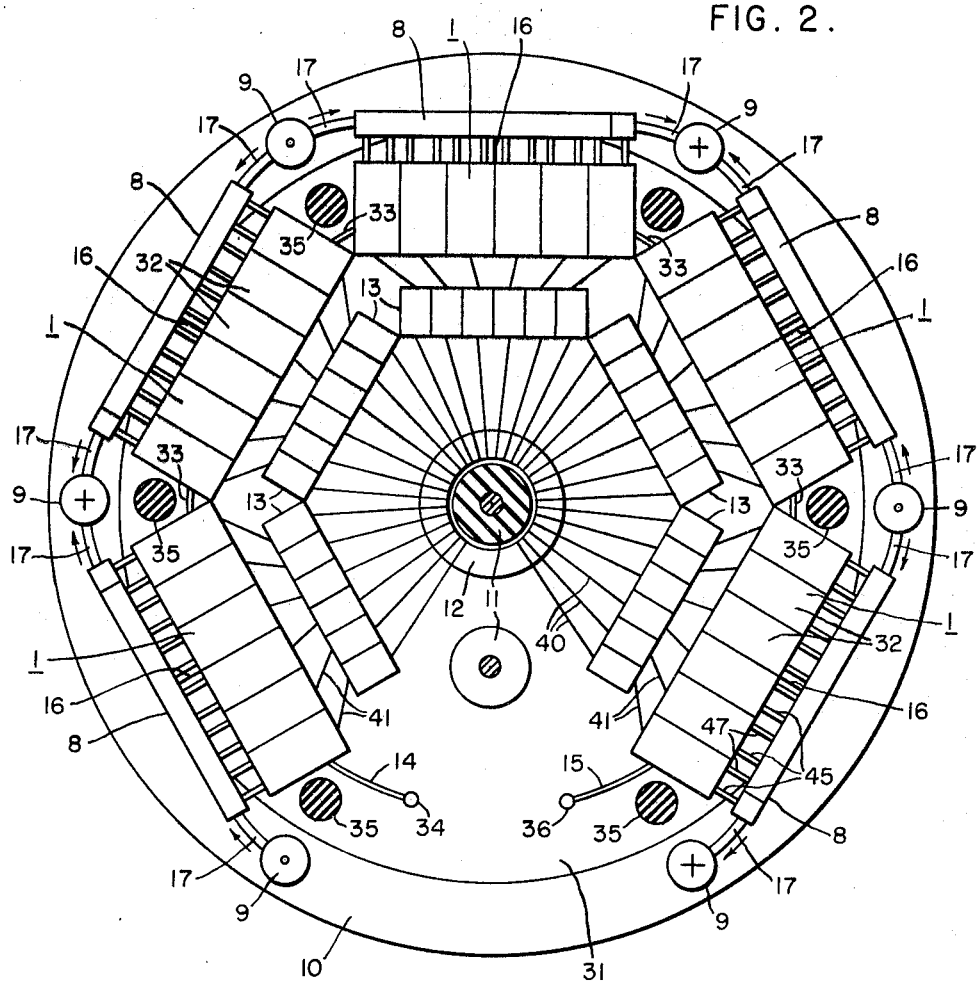
FIG. 2 is a plan view, in section, of the high voltage converter shown in FIG. 1.

FIGS. 1 and 2 are perspective and plan views, respectively, of a high voltage converter 30 of the type having a large plurality of serially connected semiconductor devices, constructed according to the teachings of the invention. Converter 30 includes a plurality of vertically spaced tiers, or layers 2, 3, 4, 5, 6 and 7, with each tier including a horizontally disposed insulating member, such as member 31 in tier 7. The insulating members 31 are vertically aligned and spaced by a plurality of vertically disposed, circumferentially spaced insulating rod members 35. Each tier has a plurality of stacks 1 formed of serially connected controlled rectifiers 32, with the stacks 1 being arranged adjacent the edges of the insulating member 31, to form a substantially regular polygonal configuration. The stacks 1 of semiconductor controlled rectifiers 32 are fluid cooled, and may be formed by stacking a predetermined plurality of disc type controlled rectifiers, and employing means for mechanically holding the stack to pressure bond the electrodes of the controlled rectifiers 32 to form a series connected string of devices. Cooling means may be disposed between each device 32 in each stack 1, which are in fluid communication with the cooling system, as will be hereinafter explained.

The stacks 1 on each of the tiers are serially connected via a conductor 33, and the conductors 14 and 15 at the ends of the series string of stacks on each tier are connected to terminals 34 and 36, respectively, as shown in FIG. 2, which are adapted for connection to similar terminals on other tiers to form the desired converter construction. As shown in FIG. 2, the stacks 1 are disposed adjacent the outer periphery of insulating member 31, tangential to an imaginary circle whose center line is the vertical axis of the converter 30. Thus, the stacks 1 define a regular polygonal configuration, which in the embodiment of the invention shown in FIGS. 1 and 2 has six sides. However, as shown in FIG. 2, instead of completing the polygonal configuration, one of its sides may be left vacant which provides space for bringing in the electrical leads 14 and 15, and for electrically interconnecting the tiers. In other words, the stacks 1 form a regular polygonal configuration having $n$ sides but the stacks may actually only be disposed on $n-1$ of the sides of the polygonal configuration.

The semiconductor controlled rectifiers 32 of the stacks 1 on each of the tiers 2, 3, 4, 5, 6 and 7 may be simultaneously provided with firing pulses by the pulse transformer arrangement disclosed in co-pending application Ser. No. 485,753, filed Sept. 8, 1965, now U.S. Patent 3,398,348, in which the primary winding is a high voltage cable 11. The cable 11 is connected to pulse means 39 and is threaded through openings in the insulating members 31 of the various tiers, at the vertical axis of the converter 30, with each tier having a magnetic core 12 encircling the cable 11. Converter 30 has first and second, or lower and upper ends, with the cable 11 upon reaching the upper end of the converter looping back to the lower end of the converter through another opening in each of the insulating members 31. Each of the magnetic cores 12 have a plurality of secondary windings wound thereon which are connected via conductors 40 to terminal boards 13, and the terminal boards 13 are connected via conductors 41 to the control terminals of the individual semiconductor controlled rectifiers 32.

As hereinbefore stated, the stacks of controlled rectifiers 32 are fluid cooled, and according to the teachings of the invention the conduit means for distributing the cooling medium to the stacks 1 is used to form voltage or stress grading means about the tiers, and at the axial ends of the converter 30.

More specifically, the cooling arrangement for the stacks 1 employs circular, tubular, headers 10 which are formed of an electrically conductive material, and disposed coaxially with the vertical axis of the converter 30 substantially adjacent the upper and lower ends of the converter 30. The round outer configuration of the headers 10 and its tubular construction, provides voltage grading rings which prevent corona from forming at the ends of the converter.

The headers 10 are joined by a plurality of vertical, parallel distributing pipes or conduit means 9, which are circumferentially spaced about the periphery of the converter 30 at the "corners" of the regular polygonal configuration formed by the stacks 1. Electrically conductive tubular means 8 are connected in fluid communication with the vertical conduit means 9 at each tier level, adjacent one of the stacks 1 of semiconductor devices 32. Electrically conductive tubular means 8 are disposed at the outer periphery of each of the tiers, adjacent each stack of controlled rectifiers, with two tubular pipes 8 being associated with each stack. One of the tubular pipes 8 is connected to one of the vertical conduit means at a predetermined corner of the polygonal configuration and to the inlet means or conduits 45 of the stack 1, and the other tubular pipe 8 is connected to the vertical conduit means 9 at the other corner of the polygonal configuration associated with the stack, and to the outlet means or conduits 47 of the stack. The electrically conductive tubular pipes 8 are each connected to its associated vertically disposed conduit means 9 via an insulating coupling member 17, for purposes which will be hereinafter explained. Thus, as shown in FIG. 2 by the dots and plus signs within the vertical conduit means 9, and by the arrows in the insulating coupling member 17, the cooling medium may be directed to flow upwardly through the tubular conduit means 9 with the dots, into the horizontally disposed electrically conductive tubular means 8 in fluid communication therewith, into the inlet conductors of the stacks 1, out of the outlet conductors of the stacks 1 to the other electrically conductive tubular means 8, and from the tubular conductive means 8 to the vertically disposed conduit means 9 having the plus sign.

The outer sides of the regular polygonal configuration formed by the stacks 1 are therefore bounded by the electrically conductive tubular means 8, which are electrically insulated from the remainder of the cooling medium distribution system by the couplings 17 formed of an electrical insulating material.

Each of the electrically conductive tubular means 8 are electrically connected to a predetermined point on its associated stack 1 of controlled rectifiers 32 via a conductor 16, as shown in FIG. 2. The electrically conductive tubular means 8 thus form segments or sections of stress or voltage control rings about each tier or level of the converter 30. The electrically conductive tubular means 8, being rounded or tubular, and being at substantially the same potential as its associated stack 1, prevent the formation of corona on the components of the tier, and aid in increasing the capacitance between the tiers, and between the devices on the tiers, to grade the voltages between the tiers and the devices.

In summary, there has been disclosed a new and improved high voltage converter 30 of the type which utilizes a plurality of semiconductor controlled rectifier devices. The semiconductor devices are arranged into a plurality of stacks of serially connected devices having inlet and outlet means for a cooling medium, and the stacks are divided into a plurality of groups. Each group of stacks are serially connected and disposed on a common plane about an axis perpendicular to the common plane, to define a substantially polygonal configuration. The plurality of groups are vertically spaced and electrically connected to form a plurality of tiers which have their axes on a common vertical center line or axis. The stacks 1 are fluid cooled, and the cooling system includes electrically conductive headers 10 disposed at the ends or extremities of the converter 30, for providing stress grading rings, and electrically conductive tubular means 8 are disposed to form the outer sides of the polygonal configuration, adjacent each stack 1 of semiconductor devices. The electrically conductive tubular means 8 adjacent each stack 1 are electrically connected to a point on its associated stack, and the electrically conductive tubular means 8 are electrically insulated from the remainder of the cooling medium distribution system. The tubular means 8 thus form sections of voltage control rings which surround each tier or level of the converter 30.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. An electrical converter, comprising:
   a plurality of stacks of serially connected semiconductor devices, including inlet and outlet means for confining and directing a fluid cooling medium in thermal communication with each stack, said stacks being divided into a plurality of groups, each disposed on a common plane about an axis perpendicular to the plane with the groups being disposed in spaced parallel relation with their axes in substantial alignment, to provide a plurality of tiers,
   means electrically interconnecting the stacks of each group, and the plurality of tiers,
   first and second tubular, electrically conductive header means disposed adjacent the end tiers,
   a plurality of spaced, parallel conduit means extending between said first and second header means, with certain of said conduit means being in fluid communication with said first header means, and the remaining conduit means being in fluid communication with said second header means,
   first and second electrically conductive tubular means disposed adjacent each stack of each tier,
   means connecting said first and second tubular means in fluid communication with the inlet and outlet means, respectively, of their associated stack,
   means insulatingly connecting said first tubular means adjacent each stack in fluid communication with a conduit means which is in fluid communication with said first header, and
   means connecting said second tubular means adjacent each stack in fluid communication with a conduit means which is in fluid communication with said second header means,
   said first and second header means providing voltage grading rings adjacent the ends of the converter, and said first and second tubular means adjacent each stack providing segmental voltage grading rings adjacent each tier.

2. The electrical converter of claim 1 including means electrically connecting a predetermined point on each stack to its associated first and second electrically conductive tubular means.

3. The electrical converter of claim 1 wherein said stacks on each plane define $n-1$ sides of a regular polygonal configuration having $n$ sides, with the means for electrically connecting said plurality of tiers being disposed at the vacant side of the polygonal configuration.

4. The electrical converter of claim 1 wherein the semiconductor devices are controlled rectifiers, and including pulse transformer means for firing said controlled rectifiers.

5. The electrical converter of claim 4 wherein said pulse transformer means includes a magnetic core and secondary windings at each tier, and a high voltage cable primary winding which threads said magnetic cores.

References Cited

UNITED STATES PATENTS 3,275,921  9/1966  Fellendorf et al.
3,398,349  8/1968  Evans et al. _____ 321—27 X LEE T. HIX, Primary Examiner
G. GOLDBERG, Assistant Examiner U.S. Cl. X.R.

317—100, 234; 321—27